Patented May 10, 1949

2,469,879

UNITED STATES PATENT OFFICE 2,469,879

PREPARATION OF BORON COMPOUNDS

Dallas T. Hurd, Schenectady, N. Y., assignor to General Electric Company, a corporation of New York No Drawing. Application October 22, 1945, Serial No. 623,858

11 Claims. (Cl. 23—204)

This invention relates to new and improved methods for the preparation of boron compounds. More particularly the invention is concerned with the method of preparing boron compounds, specifically boron hydrides (hydroborons), which comprises effecting reaction between a boron halide, specifically boron chloride, bromide, fluoride or iodide, and hydrogen while the said reactants are in contact with a mass containing an electropositive metal selected from the class consisting of the alkali metals (lithium, sodium, potassium, rubidium and caesium), the alkaline-earth metals (calcium, strontium and barium), magnesium, zinc and aluminum. Instead of using a metal of the defined class (or mixtures thereof) in free state, it may be employed in the form of an alloy with another metal which also may be a member of the same class, e. g., an alloy of aluminum and magnesium, or of a different class, e. g., an alloy of aluminum and nickel.

Prior to my invention there were two known methods for preparing boron hydrides, which also may be designated as boranes. The one method involved the reduction of a specially prepared magnesium boride in acid solution to give quite low (about 3%) yields of tetraborane (dihydrotetraborane), $B_4H_{10}$ (see A. Stock and C. Massenez, Berichte, 45, 3529, 1912). The other method, described by H. I. Schlesinger and A. Burg in J. Am. Chem. Soc., 53, 4321 (1931), consisted in the reduction of boron chloride (trichloride) or bromide (tribromide) with excess hydrogen in the electric arc or glow discharge, and yielded under optimum conditions about 25% conversion of boron halide per pass through the reaction chamber to the volatile boron hydride, diborane ($B_2H_6$), part of which appeared in combination with halogen as the unstable diborane monohalide ($B_2H_5X$).

The present invention is based on my discovery that higher yields of boron hydrides (based on the amount of boron halide used as a starting reactant) than heretofore have been known to the art may be obtained by practicing the method described briefly in the first paragraph of this specification and more fully hereafter. Thus, yields of boron hydrides estimated from the distillation data as representing a conversion of as much as 50% boron halide to boron hydride per pass through the reaction chamber have been obtained by causing the vapors of a boron halide admixed with hydrogen to contact a mass containing as an essential component an electropositive metal of the aforementioned class, the said mass being heated to the temperature of reaction between the aforesaid boron halide and hydrogen, e. g., to a temperature within the range of about 200° to about 400° C.

The products of the reaction ordinarily include diborane, diborane monohalide (an unstable product) and hydroborons having a higher boiling point (higher molecular weight) than diborane. The higher boiling boron compounds may include (depending, for example, upon the particular reaction conditions) hydroborons such, for instance, as tetraborane ($B_4H_{10}$), pentaborane ($B_5H_9$), hexaborane ($B_6H_{10}$) and decaborane ($B_{10}H_{14}$). A by-product of the reaction is a halide of the electropositive metal employed, the halogen of the boron halide combining with the metal to form the halogen salt thereof while the hydrogen is combining with the boron to form boron hydrides. The boron hydrides are separated from the other products of the reaction by any suitable means, e. g., by fractional distillation.

The defined electropositive metal or alloy thereof may be the sole component of the mass with which the mixture of boron halide and hydrogen is brought in contact at reaction temperature. Or, the contact mass may contain the electropositive metal or metals, or alloy or alloys thereof (or mixture of metal and alloy), together with other ingredients which may catalyze or otherwise facilitate the reaction. For example, the reaction between the boron halide and hydrogen advantageously may be effected while the said reactants are intimately associated with a mass containing (1) an electropositive metal of the kind defined in the first paragraph herein (or an alloy thereof) and (2) an inorganic salt capable of forming with a halide of the metal of (1) a product, specifically a eutectic mixture or a chemical compound, which is liquid at the temperature of the reaction between the aforesaid boron halide and hydrogen. By using such a contact mass the eutectic mixture or chemical compound that is formed drains from the said mass at the reaction temperature and thereby facilitates the removal of the halide of the electropositive metal from the reaction zone as it is produced. Illustrative of this embodiment of the invention is the method of preparing boron hydrides which comprises effecting reaction at an elevated temperature, e. g., at a temperature within the range of about 200° to about 400° C., between, for example, boron chloride and hydrogen while the said reactants are in contact with a mass comprising an intimate association of metallic aluminum and, for instance, sodium chloride; removing from the reaction zone while the reaction is still continuing the liquid product obtained from the aluminum chloride by-product of the reaction and the sodium chloride, and separating the boron hydrides that are formed from the other products of the reaction. Instead of sodium chloride, other inorganic salts may be intimately associated with metallic aluminum to yield a suitable contact mass, e. g., cuprous chloride or calcium chloride.

A main advantage flowing from the use of a contact mass containing both a reactive, electropositive metal and an inorganic salt of the kind above described is the elimination or lessening of any undesirable catalytic effect or chemical action that the metallic halide by-product of the reaction might have upon the hydroboron reaction products.

The reactive metals or alloys thereof that are used in practicing my invention are halogen acceptors. They are sufficiently electropositive (basic in their reactions) to combine with the halogen from the boron halide reactant and form the corresponding metallic halide within a period and at a temperature below that at which appreciable thermal decomposition of the hydroboron compounds takes place, i. e., at a temperature below about 400° C.

The conditions of reaction will vary depending, for example, upon the particular boron halide and metal (or alloy) employed, and the particular end products desired to be obtained. In general, the vapor-phase reactions are preferred because they can be carried out more economically and controlled more easily. It will be understood, of course, by those skilled in the art that the expression "vapors of a boron halide" as used generally herein and in the appended claims includes within its meaning gaseous boron fluoride.

In order that those skilled in the art better may understand how the present invention may be carried into effect, the following examples are given by way of illustration and not by way of limitation.

Example 1

A mixture of approximately equal volumes of boron chloride vapor and hydrogen gas was passed through a bed of 20-mesh granular aluminum heated to 300° to 350° C. A reaction ensued with the formation of aluminum chloride. The gaseous products of the reaction were condensed by passing the effluent gases through a condenser held at −190° C. Specific chemical tests made on a portion of the exit gas prior to condensation showed the presence of hydroborons. Distillation of the condensed product yielded diborane ($B_2H_6$), unstable diborane monochloride ($B_2H_5Cl$), and higher boiling hydroborons, as well as unreacted boron chloride. The latter may be returned to the reaction zone for further reaction with hydrogen. The diborane monochloride decomposes above about 0° C., yielding $B_2H_6$ and $BCl_3$.

Instead of using a mixture of approximately equal volumes of boron chloride vapor and hydrogen gas, other proportions have been used satisfactorily, e. g., from about 1:2 to about 1:10. Under the latter condition, i. e., using a mixture of about 1 volume of boron chloride vapor to about 10 volumes of gaseous hydrogen, tests showed that at least 50% of the total boron in the effluent gaseous reaction products was present in combination with hydrogen, i. e., as boranes and diborane monochloride. An analysis of a typical condensate follows:

| | Parts by weight |
|---|---|
| Diborane | 11 |
| Diborane monochloride | 125 |
| Fraction containing a mixture of diborane monochloride and boron chloride | 492 |
| Higher boiling hydroborons (boranes) | 4 |

Calculation of the analytical data shows that the boron content of the condensate was apportioned, by weight, as follows: 8.2% in the diborane; 45.6% in the diborane monochloride, which is a ready source of more diborane because of its instability; 42.8% in the fraction containing a mixture of diborane monochloride and unreacted boron chloride (assumed for purpose of calculation as being all boron chloride); and 3.4% in the higher boiling hydroborons.

Example 2

The vapor of boron chloride and hydrogen gas in about 1:10 volume ratio were passed through finely divided magnesium heated to 350° C. Magnesium chloride was formed. The gaseous products of reaction were condensed at −190° C. as in Example 1. Products of the distillation of the condensate included diborane, diborane monochloride and unreacted boron chloride.

Example 3

Boron chloride vapor and hydrogen gas in about 1:3 volume ratio were bubbled through molten sodium. At 300° C. a reaction took place with the formation of sodium chloride. The presence of hydroboron compounds as reaction products in the exit gas was confirmed by specific chemical tests for these compounds.

Example 4

Gaseous boron fluoride and hydrogen gas in about 1:3 volume ratio were passed through finely divided, heated magnesium. At 375° C. a reaction took place, the presence of hydroboron compounds in the exit gas being confirmed by specific chemical tests for their presence. Magnesium fluoride was obtained as a by-product of the reaction.

Example 5

Boron bromide vapor and hydrogen gas in about 1:10 volume ratio were passed over granular aluminum. At about 200° C. the reducing action started, being continued at about 250° C. Aluminum bromide was formed. The presence of hydroboron compounds in the effluent gaseous reaction products, which were condensed at −190° C., was confirmed by specific chemical tests for these compounds.

Example 6

Boron bromide vapor and hydrogen gas in about 1:10 volume ratio were passed over finely divided magnesium. The reaction temperature reached about 400° C. as a maximum. Magnesium bromide was obtained as a by-product of the reaction, and the presence of hydroboron compounds in the exit gaseous reaction products was confirmed by specific chemical tests for their presence.

Example 7

Same as described in the first paragraph of Example 1 with the exception that the contact mass comprised a mixture of, by weight, about 1 part sodium chloride and 3 parts metallic aluminum. The aluminum chloride by-product of the reaction formed a liquid product with the sodium chloride at the reaction temperature. This liquid product drained readily from the contact mass, thereby facilitating the reaction and obviating the use of a special condenser for removing aluminum chloride from the gaseous reaction products.

It will be understood, of course, by those skilled in the art that my invention is not limited to the specific boron halides and metals named in the above illustrative examples. Thus, boron iodide also may be employed, and likewise electropositive metals of the class defined in the first paragraph herein other than the metallic magnesium, aluminum and sodium employed in the examples, as well as alloys of the defined electropositive metals with each other or with other metals.

It also will be understood that the invention is not limited to the specific temperatures or temperature ranges mentioned in the examples. However, it is desirable that the reaction temperature should not be so high as to cause decomposition of the boron hydrides, as they are formed, to a substantial extent or the deposition of excessive amounts of metallic boron upon the contact mass. The optimum reaction temperature will vary depending, for instance, upon the particular boron halide and metal (or alloy) employed, and other influencing factors, but ordinarily will be within the range of approximately 200° to 400° C.

What I claim as new and desire to secure by Letters Patent of the United States, is:

1. The method of preparing boron compounds which comprises effecting reaction at a temperature of from 200° to 400° C. between a boron halide and hydrogen while the said reactants are in contact with a mass containing an electropositive metal selected from the class consisting of the alkali metals, the alkaline-earth metals, magnesium, zinc and aluminum.

2. The method of preparing boron compounds which comprises causing the vapors of a boron halide admixed with hydrogen to contact a mass containing an electropositive metal selected from the class consisting of the alkali metals, the alkaline-earth metals, magnesium, zinc and aluminum, said mass being heated to the temperature of reaction between the aforesaid boron halide and hydrogen.

3. The method of preparing boron compounds which comprises effecting reaction at a temperature of from 200° to 400° C. between boron chloride and hydrogen while the said reactants are in contact with a mass containing an electropositive metal selected from the class consisting of the alkali metals, the alkaline-earth metals, magnesium, zinc and aluminum.

4. The method of preparing boron compounds which comprises effecting reaction at a temperature of from 200° to 400° C. between boron bromide and hydrogen while the said reactants are in contact with a mass containing an electropositive metal selected from the class consisting of the alkali metals, the alkaline-earth metals, magnesium, zinc and aluminum.

5. The method of preparing boron compounds which comprises effecting reaction at a temperature of from 200° to 400° C. between boron fluoride and hydrogen while the said reactants are in contact with a mass containing an electropositive metal selected from the class consisting of the alkali metals, the alkaline-earth metals, magnesium, zinc and aluminum.

6. The method of preparing boron compounds which comprises causing the vapors of a boron halide admixed with hydrogen to contact a mass containing metallic aluminum heated to the temperature of reaction between the aforesaid boron halide and hydrogen.

7. The method of preparing boron compounds which comprises causing the vapors of a boron halide admixed with hydrogen to contact a mass containing metallic magnesium heated to the temperature of reaction between the aforesaid boron halide and hydrogen.

8. The method of preparing boron hydrides which comprises effecting reaction at a temperature of from 200° to 400° C. between a boron halide and hydrogen while the said reactants are intimately associated with a mass containing (1) an electropositive metal selected from the class consisting of the alkali metals, the alkaline-earth metals, magnesium, zinc and aluminum, and (2) an inorganic salt capable of forming with a halide of the metal of (1) a product which is liquid at the temperature of the reaction between the aforesaid boron halide and hydrogen, and separating the boron hydrides that are formed from the other products of the reaction.

9. The method of preparing boron hydrides which comprises effecting reaction at a temperature within the range of about 200° to about 400° C. between a boron halide and hydrogen while the said reactants are in contact with an electropositive metal selected from the class consisting of the alkali metals, the alkaline-earth metals, magnesium, zinc and aluminum, and separating the boron hydrides that are formed from the other products of the reaction.

10. The method of preparing boron hydrides which comprises effecting reaction at a temperature within the range of about 200° to about 400° C. betwen a boron halide and hydrogen while the said reactants are in contact with a mass containing metallic aluminum, and separating the boron hydrides that are formed from the other products of the reaction.

11. The method of preparing boron hydrides which comprises effecting reaction at a temperature within the range of about 200° to about 400° C. between boron chloride and hydrogen while the said reactants are in contact with a mass comprising an intimate association of metallic aluminum and sodium chloride, and separating the boron hydrides that are formed from the other products of the reaction.

DALLAS T. HURD.

No references cited.